US009965548B2

(12) United States Patent
Haggar et al.

(10) Patent No.: US 9,965,548 B2
(45) Date of Patent: May 8, 2018

(54) ANALYZING NATURAL LANGUAGE QUESTIONS TO DETERMINE MISSING INFORMATION IN ORDER TO IMPROVE ACCURACY OF ANSWERS

(71) Applicant: International Business Machines Corporation, Armonk, NY (US)

(72) Inventors: Peter F. Haggar, Raleigh, NC (US); Dane A. Johnson, Townsend, MA (US); Mark G. Megerian, Rochester, MN (US); John E. Petri, St. Charles, MN (US); Stephan J. Roorda, Fuquay-Varina, NC (US); Leah R. Smutzer, Rochester, MN (US); Richard J. Stevens, Monkton, VT (US); Richard L. Stillwell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 14/097,655

(22) Filed: Dec. 5, 2013

(65) Prior Publication Data

US 2015/0161241 A1 Jun. 11, 2015

(51) Int. Cl.
*G06F 7/00* (2006.01)
*G06F 17/30* (2006.01)
(Continued)

(52) U.S. Cl.
CPC ....... *G06F 17/30654* (2013.01); *G06Q 10/10* (2013.01); *G09B 5/02* (2013.01)

(58) Field of Classification Search
CPC .......... G06F 17/30864; G06F 17/3053; G06F 17/30867; G06F 17/30011; G06Q 30/02
(Continued)

(56) References Cited

U.S. PATENT DOCUMENTS 7,139,717 B1 11/2006 Abella et al.
7,693,705 B1 4/2010 Jamieson
(Continued)

FOREIGN PATENT DOCUMENTS

EP 1 793 318 A2 6/2007

OTHER PUBLICATIONS

Bakhtyar, Maheen et al., "Creating Missing Classes Automatically to Improve Question Classification in Question Answering Systems", 2012 Seventh International Conference on Digital Information Management (ICDIM'2012), Aug. 2012, pp. 99-103.
(Continued)

*Primary Examiner* — Hosain Alam
*Assistant Examiner* — Nicholas Allen
(74) *Attorney, Agent, or Firm* — Kristofer L. Haggerty

(57) ABSTRACT

A mechanism is provided in a data processing system comprising a processor and a memory configured to implement a question and answer system (QA), for improving answers to an input question. An input question is received and parsed for a known set of critical information required to answer the input question. Responsive to one or more pieces of critical information failing to be identifiable in the input question, a user who submitted the input question is prompted for the one or more pieces of critical information via a graphical user interface (GUI).

15 Claims, 5 Drawing Sheets

(51) Int. Cl.
*G09B 5/02* (2006.01)
*G06Q 10/10* (2012.01)

(58) Field of Classification Search
USPC .......................................................... 707/723
See application file for complete search history.

(56) References Cited

U.S. PATENT DOCUMENTS

| | | | |
|---|---|---|---|
| 9,257,056 B2 | 2/2016 | Sahuguet et al. | |
| 2004/0117352 A1 | 6/2004 | Schabes et al. | |
| 2004/0249796 A1* | 12/2004 | Azzam | G06F 17/3043 |
| 2007/0033221 A1* | 2/2007 | Copperman | G06F 17/30616 |
| 2008/0189623 A1* | 8/2008 | Patil | H04L 12/1827 715/753 |
| 2009/0162824 A1* | 6/2009 | Heck | G06Q 10/10 434/322 |
| 2009/0210411 A1* | 8/2009 | Murata | G06F 17/30663 |
| 2009/0287678 A1 | 11/2009 | Brown et al. | |
| 2010/0030769 A1* | 2/2010 | Cao | G06F 17/30696 707/738 |
| 2010/0307435 A1* | 12/2010 | Winstead | F02D 13/0207 123/90.15 |
| 2011/0071819 A1 | 3/2011 | Miller et al. | |
| 2011/0087656 A1* | 4/2011 | Oh | G06F 17/30654 707/727 |
| 2011/0125734 A1 | 5/2011 | Duboue et al. | |
| 2011/0230187 A1* | 9/2011 | Jeon | H04B 7/2606 455/434 |
| 2011/0231353 A1* | 9/2011 | Wang | G06Q 10/10 706/45 |
| 2011/0307435 A1* | 12/2011 | Overell | G06F 17/278 706/46 |
| 2011/0320187 A1 | 12/2011 | Motik et al. | |
| 2012/0041950 A1* | 2/2012 | Koll | G09B 7/02 707/728 |
| 2012/0078837 A1* | 3/2012 | Bagchi | A61B 5/00 706/52 |
| 2012/0209863 A1* | 8/2012 | Hidesawa | G06F 17/30637 707/755 |
| 2012/0301864 A1* | 11/2012 | Bagchi | G09B 7/02 434/362 |
| 2013/0007037 A1* | 1/2013 | Azzam | G06F 17/30654 707/769 |
| 2013/0007055 A1 | 1/2013 | Brown et al. | |
| 2013/0013546 A1 | 1/2013 | Bagchi et al. | |
| 2013/0017524 A1* | 1/2013 | Barborak | G09B 7/04 434/322 |
| 2013/0018652 A1 | 1/2013 | Ferrucci et al. | |
| 2013/0066886 A1 | 3/2013 | Bagchi et al. | |
| 2013/0132308 A1* | 5/2013 | Boss | G06F 17/30976 706/12 |
| 2013/0173519 A1 | 7/2013 | Antebi et al. | |
| 2013/0226846 A1* | 8/2013 | Li | G06N 5/02 706/12 |
| 2013/0246098 A1* | 9/2013 | Habboush | G06Q 10/10 705/3 |
| 2013/0262501 A1* | 10/2013 | Kuchmann-Beauger | G06F 17/30451 707/769 |
| 2013/0268260 A1* | 10/2013 | Lundberg | G06F 17/28 704/8 |
| 2013/0275164 A1* | 10/2013 | Gruber | G10L 17/22 705/5 |
| 2013/0282363 A1* | 10/2013 | Fan | G06F 17/2872 704/9 |
| 2013/0297553 A1* | 11/2013 | Bierner | G06N 99/005 706/52 |
| 2014/0072948 A1 | 3/2014 | Boguraev et al. | |
| 2015/0161241 A1* | 6/2015 | Haggar | G06F 17/30654 707/723 |

OTHER PUBLICATIONS

High, Rob, "The Era of Cognitive Systems: An Inside Look at IBM Watson and How it Works", IBM Corporation, http://ip.com/pdf/redbook/REDP495500.pdf, 2012, 16 pages.

Yuan, Michael J., "Watson and healthcare", IBM Corporation, IBM developerWorks, http://www.ibm.com/developerworks/industry/library/ind-watson, Apr. 12, 2011, 7 pages.

* cited by examiner

ANALYZING NATURAL LANGUAGE QUESTIONS TO DETERMINE MISSING INFORMATION IN ORDER TO IMPROVE ACCURACY OF ANSWERS

BACKGROUND

The present application relates generally to an improved data processing apparatus and method and more specifically to mechanisms for analyzing natural language questions to determine missing information in order to improve accuracy of answers.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system comprising a processor and a memory configured to implement a question and answer system (QA), is provided for improving answers to an input question. The illustrative embodiment receives the input question and parses the input question for a known set of critical information required to answer the input question. The illustrative embodiment prompts a user who submitted the input question for the one or more pieces of critical information via a graphical user interface (GUI) in response to one or more pieces of critical information failing to be identifiable in the input question.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
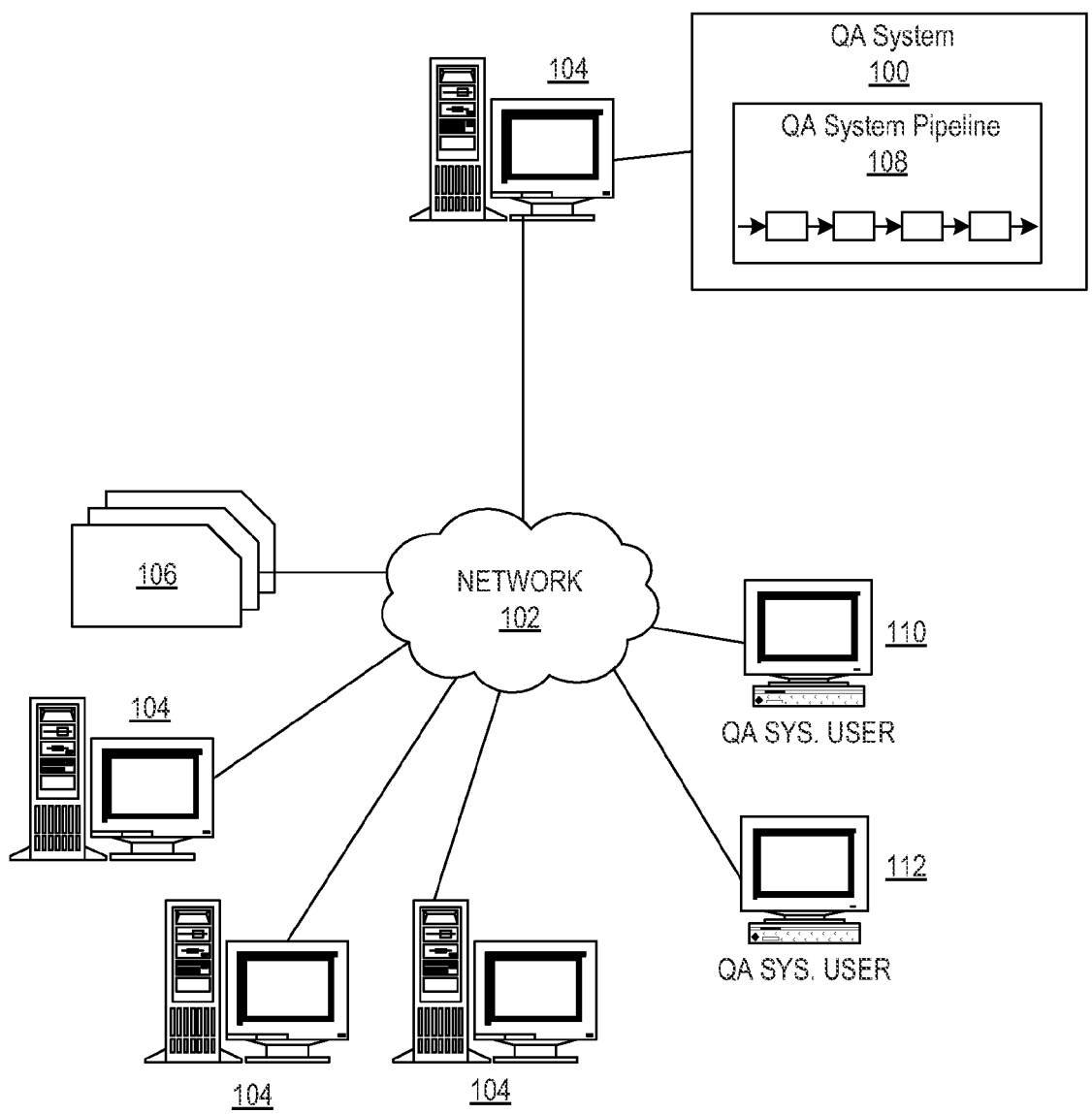
FIG. 1 is an example diagram of a distributed data processing system in which aspects of a Question and Answer system of the illustrative embodiments may be implemented.

Question and Answer (QA) systems, such as IBM's Watson™ QA system, require a significant amount of compute power to analyze a natural language question and determine the results from candidate findings. Further, in a question and answering system such as IBM's Watson™ QA system, for any knowledge domain, corpora, or corpus, many questions may be responded to with more definitive answers if all known and relevant data is either entered as part of the question or available as a collection of input with regard to the question. For instance, in a medical knowledge domain, missing diagnostic data, ambiguous notes, crucial patient information, or the like, not caught before processing the input, may cause an answer to be returned with low confidence. Currently, other than responding to questions with "Did you mean?" to cover spelling errors or the typical form validation for required fields, there are no current means to determine whether all pertinent information is supplied with regard to a question in a natural language system dealing with unstructured data. For the purposes of the illustrative embodiments, the term "question" means both a question as well as a "collection of data and information" associated with the given question that should be available as input. Thus, the illustrative embodiments provide for analyzing natural language questions to determine missing information in order to improve accuracy of answers.

With the mechanisms of the illustrative embodiments, as a user enters a question into the QA system, natural language processing determines whether critical information in the question and/or with associated input is missing or comprises ambiguous terminology. If the natural language processing determines that information in the question is missing or ambiguous, the illustrative embodiments return a request for the specific missing information without providing an answer to the question. However, if all critical information is provided but other essential information that would improve the answer is missing or is ambiguous, the illustrative embodiments respond with an answer but with a lower confidence. That is, the QA systems of the illustrative embodiments recognize that, only through having all or a majority of the essential information, more definitive answers may be provided. If some of the essential but not critical information is missing or is ambiguous, then the illustrative embodiments provide one or more answers, but also indicate other information that is missing or is ambiguous, which, if provided or clarified, would improve the answers.

More specifically, during question processing in a QA system, the QA system first determines whether all critical information has been provided either directly in the question or in information associated with the question. For example, consider the following question: "What is the diagnosis for a patient with symptoms S1, S2, and S3?" The QA system parses the question and determines whether all specific annotators are provided with regard to the required critical information. That is, with regard to the above question as presented and the critical information identified by the specific QA system administrator and/or trainer, the illustrative embodiments would quickly determine missing critical information, such as patient gender, patient age, patient current history, patient family history, current medications and doses, blood test results, or the like. However, the QA system is also able to learn on its own. That is, if the above exemplary question is asked while the doctor, nurse, specialist, or the like, is within a patient's electronic file, then the QA system would recognize that the question is being asked for the current patient and parse the information associated with the patient to ascertain the critical information. Thus, the QA system of the illustrative embodiments may oftentimes be able to identify missing information in a straightforward manner. That is, the QA system may easily be able to identify specific attributes and, thus, easily identify those critical attributes as missing. More complex phrases and conditions offer more of a challenge and a less clear line of what is and is not information and, thus, what information is missing.

Further, if critical information is provided but the information is in some way ambiguous, the QA system may request clarification. For example, if current medications and dose information states "tried multiple antibiotics," "has been taking Augmentin® for a while," or "Z-pack and other," each of these phrases comprises ambiguous information. That is, what does the terms "multiple," "for a while," and "other" mean. Thus, the illustrative embodiment provide for respond with clarifying question, such as "Please provide the name of all antibiotics taken," "Please provide exact dosage of Augmentin® taken," or "Please list the other medications taken."

Once all the critical information is provided, the illustrative embodiments analyzes the information provided in the question as well as all information associated with the patient as a basis for determining a similarity between the information in the questions and all known diseases, illnesses, conditions, or the like, which is hereinafter referred to collectively as diseases. That is, the QA system may make an initial correlation between the provided symptoms S1, S2, and S3 to all known diseases in order to identify a subset of diseases. Once this subset of diseases is identified, the QA system starts to further refine the subset of diseases by eliminating those items that are not within the information associated with the patient. For example, if the subset of diseases comprises diseases associated with males only, diseases associated with females only, and diseases associated with males and females and the patient is a female, then the QA system may easily eliminate those diseases associated with males only from the subset of diseases. Other eliminations may be made with regard to age, current history, family history, current medications and doses, blood test results, travel history, or the like.

After the subset of diseases has been refined based on as many possible eliminations as possible, the QA system analyzes the subset of diseases to determine whether there is any other information associated with the patient that would further narrow the subset. That is, some diseases may have additional annotators that, if met, would either eliminate or retain the disease as a possibility. For example, if a disease has a annotator of being associated with a visit to Belize and the information associated with the patient indicates that the patient has traveled outside the country but provide no indication of where, then the QA system identifies this missing information as being needed for further refinement of the subset of diseases. As an additional example, if a disease has a annotator of requiring a positive result to a test T1 and the patient information either indicates such a test has not been ordered or the results of such a test are not found in the patient information, then the QA system identifies this missing information as being needed for further refinement of the subset of diseases.

Once the remaining diseases in the subset of diseases have been refined either through elimination or through the identification of missing information, the QA system associates a confidence score with each of the remaining diseases. That is, each disease has a specific set of criteria that has to be met in order to definitively indicate that this is the disease the patient has. If the patient's symptoms and associated information only meets 60 percent of the criteria for the disease, then the QA system associates a confidence score of 60 with that disease. Once all diseases in the set of diseases have been scored, the QA system responds to the question with the subset of diseases, their associated missing information, and the associated confidence score. The following is an example of an answer that may be provided to the initial question of "What is the diagnosis for a patient with symptoms S1, S2, and S3?"

Answers:
   Patient may have Disease D1—50% confidence
      Met information: Symptom S1 and S3.
      Missing information: Symptom S4, whether patient visited
      Belize in last 2 years.
   Patient may have Disease 2—37% confidence
      Met information: Symptom S2.
      Missing information: Test T1 is positive.

As the medical professions enter additional information to address the missing information, the QA system would be able to refine the already identified subset of diseases as well as identify other diseases based on the new information.

While the above example is directed to the medical field, it is recognized that the described identification of missing information and diagnostic may be applied to numerous fields, such as call centers that address computer issues, automobile repairs in identifying causes for issues customers are experiencing, or the like. Further, as users enter questions into the system, if the QA system returns answers that indicate missing information, the returned missing information inquiries may be done in both interactive mode (conversational Watson) or "batch" mode of operation. Batch mode would be when multiple questions are submitted together (overnight for example) and the results are checked at a later time. For batch mode, the returned results identifies missing information so users may provide the missing information if necessary and resubmit their questions later with more information.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
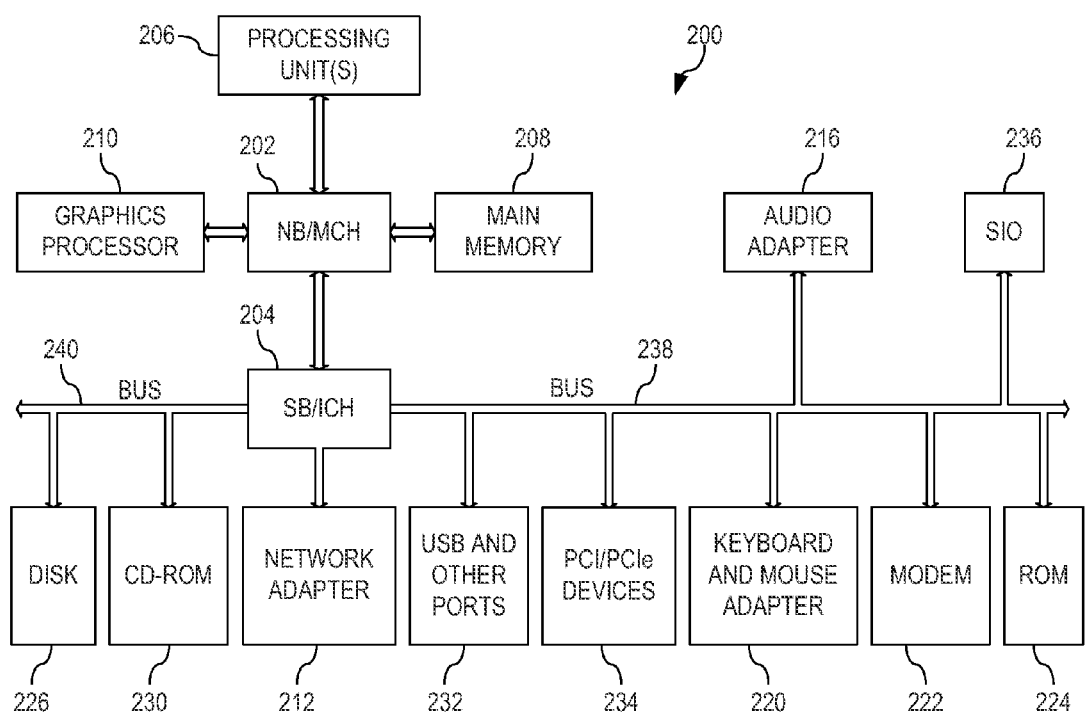
FIG. 2 is an example block diagram of a computing device in which aspects of the illustrative embodiments may be implemented.
Figure 3:
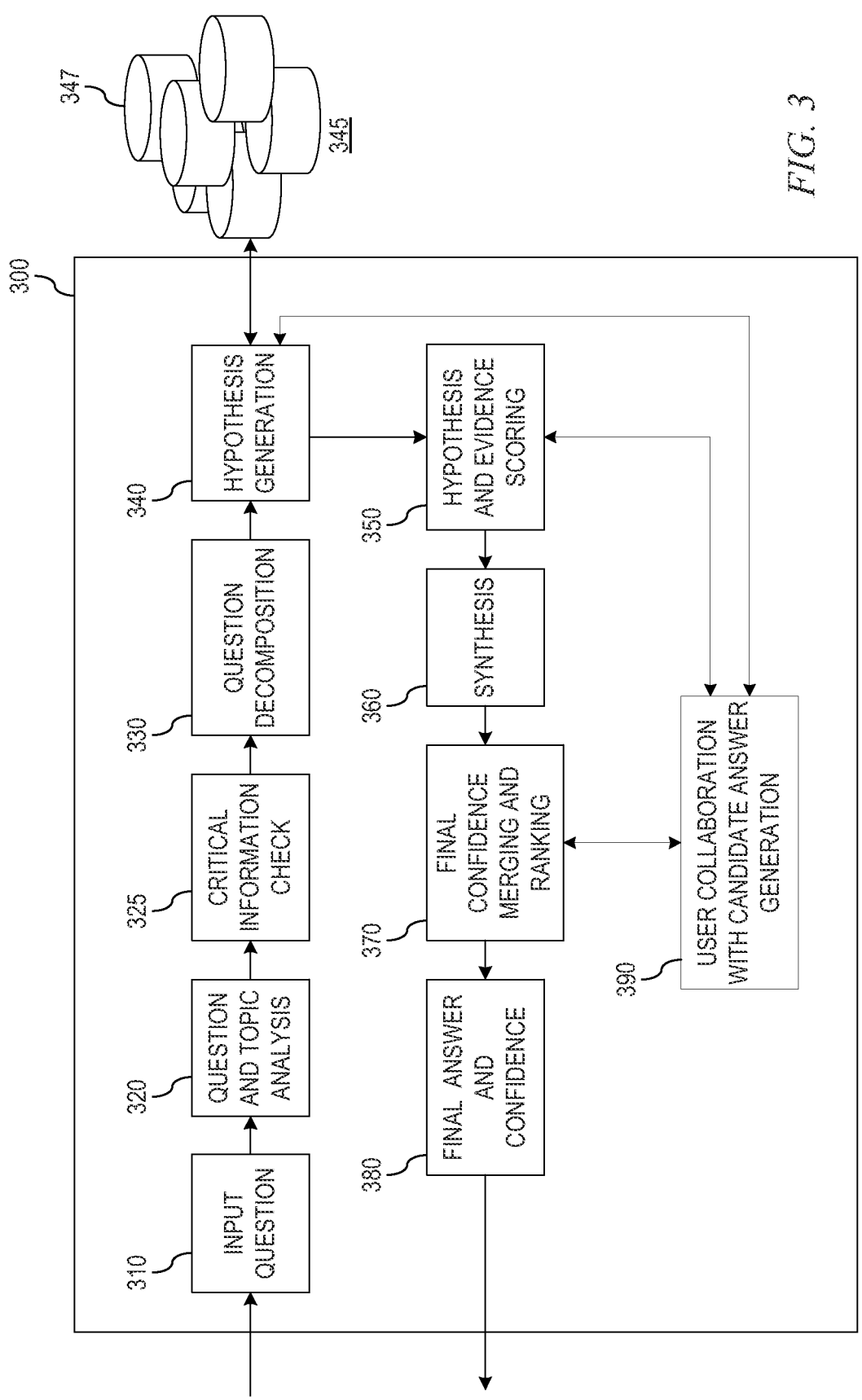
FIG. 3 illustrates a QA system pipeline for processing an input question in accordance with one illustrative embodiment.

The illustrative embodiments may be utilized in many different types of data processing environments. FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to analyzing natural language questions to determine missing information in order to improve accuracy of answers. Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify this question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of data 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only).

Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular knowledge domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM® Corporation website, IBM Redbooks®, and the like. For example, information about the Watson™ QA system can be found in Yuan et al., "Watson and Healthcare," IBM developerWorks®, 2011 and "The Era of Cognitive Systems: An Inside Look at IBM Watson and How it Works" by Rob High, IBM Redbooks®, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a response. In an initial question input stage 310, the QA system receives an input question that is presented in a natural language format. That is, a user may input, via a user interface, an input question for which the user wishes to obtain an answer, e.g., "What is the diagnosis for a patient with symptoms S1, S2, and S3?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "what" may be associated with a topic for "diseases" indicating that the identity of a disease is being sought, "patient" may be identified as a human by association with the facility where the QA system pipeline resides, "symptom" may be identified as a word indicative of declarative criteria, and "S1, S2, and S3" may be indicative of nouns or adjective defining the symptoms.

The identified major features may then be used in a critical information check phase 325 to determine whether enough critical information has been provided or is readable identifiable to answer the question. With regard to the received question, critical information check phase 325 determines whether all specific annotators are provided with regard to the required critical information based on a pre-defined set of critical annotators defined by an administrator and/or trainer. The set of critical annotators, with regard to a medical corpus, may be patient gender, patient age, patient current history, patient family history, current medications and doses, blood test results, or the like. Critical information check phase 325 analyzes the question first to determine whether this information is explicitly provided. However, if the information is not explicitly provided in the received question, critical information check phase 325 uses its learning capabilities to determine whether the question was submitted from within a patient's electronic file and, thus, critical information check phase 325 ascertains that the question is for the current patient and parses the corpus of data/information 345 for information associated with the patient to determine whether all critical information is denoted in the input information associated with the patient.

Additionally, if all or a subset of the critical information is identified from the question or from the other input information related to the patient, critical information check phase 325 further determines whether the identified critical information is in some way ambiguous. For example, if current medications and dose information states "tried multiple antibiotics," "has been taking Augmentin® for a while," or "Z-pack and other," each of these phrases comprises ambiguous information. That is, what does the terms "multiple," "for a while," and "other" mean. Thus, critical information check phase 325 responds with clarifying question, such as "Please provide the name of all antibiotics taken," "Please provide exact dosage of Augmentin® taken," or "Please list the other medications taken." Further, if other critical information is missing, critical information check phase 325 responds with, for example, "Please provide the patients age." These responses as to the missing and/or ambiguous information may be presented to the user via state 390, which will be described in detail hereinafter.

Once all the critical information has been provided either associated with the question or via identified patient information, the identified major features may then be used during the question decomposition stage 330 to decompose the question into one or more queries that may be applied to the corpus of data/information 345 in order to generate one or more hypotheses. The queries may be generated in any known or later developed query language, such as the Structure Query Language (SQL), or the like. The queries may be applied to one or more knowledge domains or databases storing information about the electronic texts, documents, articles, websites, and the like, that make up the corpora of data/information 345. That is, these various sources themselves, collections of sources, and the like, may represent different corpus 347 within the corpora 345. There may be different corpus 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM® Redbooks® documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Further, hypothesis and evidence scoring stage 350 also determines whether there is missing information and or ambiguous information that would increase the scoring of each candidate answer. That is, if a given candidate answer meets one or more of the annotators associated with the received question but has an additional annotator that is not identifiable or is unclear in the corpus of data/information 345, then hypothesis and evidence scoring stage 350 associates this missing or ambiguous information with the given candidate answer. Each reasoning algorithm in hypothesis and evidence scoring stage 350 generates a score based on the analysis it performs which indicates a measure of relevance of the individual portions of the corpus of data/information extracted by application of the queries, a measure of the missing or ambiguous information, as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question. The set of candidate answers is output via a graphical user interface generated using the mechanisms of the illustrative embodiment, which provide the user with the tools for collaborating with the QA system to review, evaluate, and modify the listing of candidate answers and the evidence associated with these candidate answers that is evaluated by the QA system.

As shown in FIG. 3, in accordance the illustrative embodiments, after stage 380, or as part of stage 380, the set of candidate answers is output via a graphical user interface generated using the mechanisms of the illustrative embodiment, which provide the user with the tools for collaborating with the QA system to review, evaluate, and modify the listing of candidate answers and the evidence associated with these candidate answers that is evaluated by the QA system.

That is, as shown in FIG. 3, at stage 390, the graphical user interface engine of the illustrative embodiments not only receives the final ranked listing of candidate answers generated by the QA system pipeline 300, but also receives the underlying evidence, missing, and/or ambiguous information for each of the candidate answers from the hypothesis and evidence scoring stage 350, and uses this information to generate a graphical user interface outputting the ranked listing of candidate answers and an output of the selected portions of the corpus of data/information that supports and/or detracts, from the candidate answers being the correct answer for the input question, referred to hereafter as the "evidence passages."

At stage 390, the graphical user interface (GUI) that is generated comprises logic for receiving user inputs related to the evidence passages, e.g., words, phrases, sentences, and the like, for use in generating additional candidate answers and/or modifying current candidate answers. That is, via the GUI, the user may respond to a portion of the evidence passage to generate a new candidate answer and the GUI may feed that information back into the QA system pipeline 300, such as at stage 340 or 350, for use in evaluating current candidate answers and/or generating new candidate answers via the hypothesis and evidence scoring stage 350 using the various reasoning algorithms and generating relevance scores which may then be used to generate a confidence score for the newly generated candidate answer. As a result, the GUI may be updated to include the newly generated candidate answer in the portion of the GUI that outputs the ranked listing of candidate answers, assuming that the confidence score for the newly generated candidate answer meets threshold requirements for depiction as a probable answer to the input question, e.g., a minimum confidence score, or may always output user generated candidate answers despite the candidate answer not meeting such threshold requirements. Similarly, the portion of the GUI that outputs the underlying evidence passages associated with candidate answers may be automatically updated to include entries for the newly generated candidate answer and its associated evidence passages.

Moreover, the GUI may include GUI elements for invoking logic and functionality of the GUI for removing evidence passages from the listing of associated evidence passages for the various candidate answers and/or modifying a relevance score associated with the evidence passage. In this way, the user essentially supersedes the evaluation made by the QA system pipeline 300 and instead imposes the user's subjective determination as to the relevance of an evidence passage by either eliminating it altogether or increasing/reducing the relevance score associated with the evidence passage to indicate the user's own subjective evaluation of the evidence passage's relevance to the candidate answer being the correct answer for the input question.

In addition, the GUI may include GUI elements for allowing a user to "drill down" within each evidence passage to obtain additional information about the source of the evidence passage. This drill down logic allows a user to select a link in the evidence passage output that results in the user being presented with information regarding the source of the evidence passage, the context in which the evidence passage is present within the source document, and the like. Thus, for example, if the user wishes to drill down to the source document to perform a more detailed analysis of the surrounding context of the evidence passage to determine whether the evidence passage is relevant to the candidate answer, or if other information may be gleaned from the context surrounding the evidence passage, then the drill down logic of the GUI may be used to achieve this. Other information that may be pertinent to the user's evaluation of the evidence passage may also be accessible via the drill-down logic including information regarding the reliability of the source document as a whole and other information for evaluating the veracity and reliability of the evidence passage.

Should the user eliminate the evidence passage or modify the evidence passage's relevance score in some manner, the QA system pipeline 300 may automatically adjust the relevance scores, confidence scores, and ranked listing of candidate answers based on the change to the evidence passage. In this way, the QA system pipeline 300 may dynamically adjust its output based on user collaboration with the QA system to provide the user's subject determination of the relevance, reliability, and correctness of the evidence passages and/or the candidate answers themselves.

With regard to the candidate answers themselves, the GUI may further provide GUI elements for eliminating candidate answers from the ranked listing of candidate answers and for providing free-form entry of new candidate answers. The GUI elements for eliminating the candidate answers, if selected, may remove the candidate answer from the ranked listing of candidate answers and may automatically result in the corresponding entries in the evidence passage portion of the GUI being removed. In this way, the candidate answer is completely removed as a candidate answer for the input question.

With regard to the free-form entry of new candidate answers, a text entry field, or the like, may be provided into which a user may type a candidate answer via a keyboard, enter via a speech-to-text mechanism, or any other way in which a user may enter a textual word, phrase, sentence, or the like. The newly entered candidate answer may be automatically added to the ranked listing of candidate answers and fed into the QA system pipeline 300, such as at stage 340 or 350, for evaluation, generation of relevance scores for extracted portions of the corpus of data/information, and generation of a confidence score for the newly generated candidate answer.

The processes described above may be done repeatedly as the user sees fit until the user is satisfied with the state of the ranked listing of candidate answers and the corresponding evidence passages associated with the candidate answers in the ranked listing of candidate answers. This information may then be stored in association with the input question, an identifier of the input question, one or more of the queries generated based on the input question, or the like, for later retrieval and use. This stored information may be used for training purposes to train the QA system, e.g., training the operation of the statistical model of the QA system, modifying weights assigned to reasoning algorithms, or the like. This information may also be used to compare results generated by the QA system when evaluating a subsequent submission of the same or similar input question in order to see how the corpus of data/information has changed over time and/or how these changes may have changed the resulting candidate answers generated by the QA system, e.g., comparing the stored candidate answers and corresponding evidence passages with the later generated candidate answers and corresponding evidence passages and identifying the differences. The stored information may also be used as a cache of sorts to provide a quick retrieval of results of similar input questions or similar queries. Other uses of the stored information may also be made based on the operation of the mechanisms of the illustrative embodiments generating this stored information.

Thus, using the mechanisms described above, or equivalent mechanisms in other QA systems generally known in the art which are augmented to include the GUI logic mechanisms of the illustrative embodiments, a system is developed that can be used to analyze natural language questions to determine missing information in order to improve accuracy of candidate answers and corresponding evidence passages in support thereof. The QA system may comprise multiple engines or modules comprising logic for performing various operations for processing an input question in a natural language, determining whether critical information is missing and/or is ambiguous in the questions or associated with the question, searching a corpus of information for generating candidate answers to the input question, identifying missing and/or ambiguous information associated with each of the candidate answers, ranking or scoring the candidate answers, performing a final merging of the scored or ranked candidate answers to generate a single ultimate answer to the input question. Thus, the QA system may comprise engines/modules for performing question analysis, content analysis of documents in a corpus of information, primary search, candidate answer generation, candidate answer scoring/ranking, and final merging of candidate answers. In addition, with the mechanisms of the illustrative embodiments, graphical user interface logic, engines, modules, or the like, are provided which provide the user with the ability to collaborate with the QA system in the various ways previously described to modify or adjust the candidate answer generation and use of evidence passages for evaluating the candidate answers.

Figure 4:
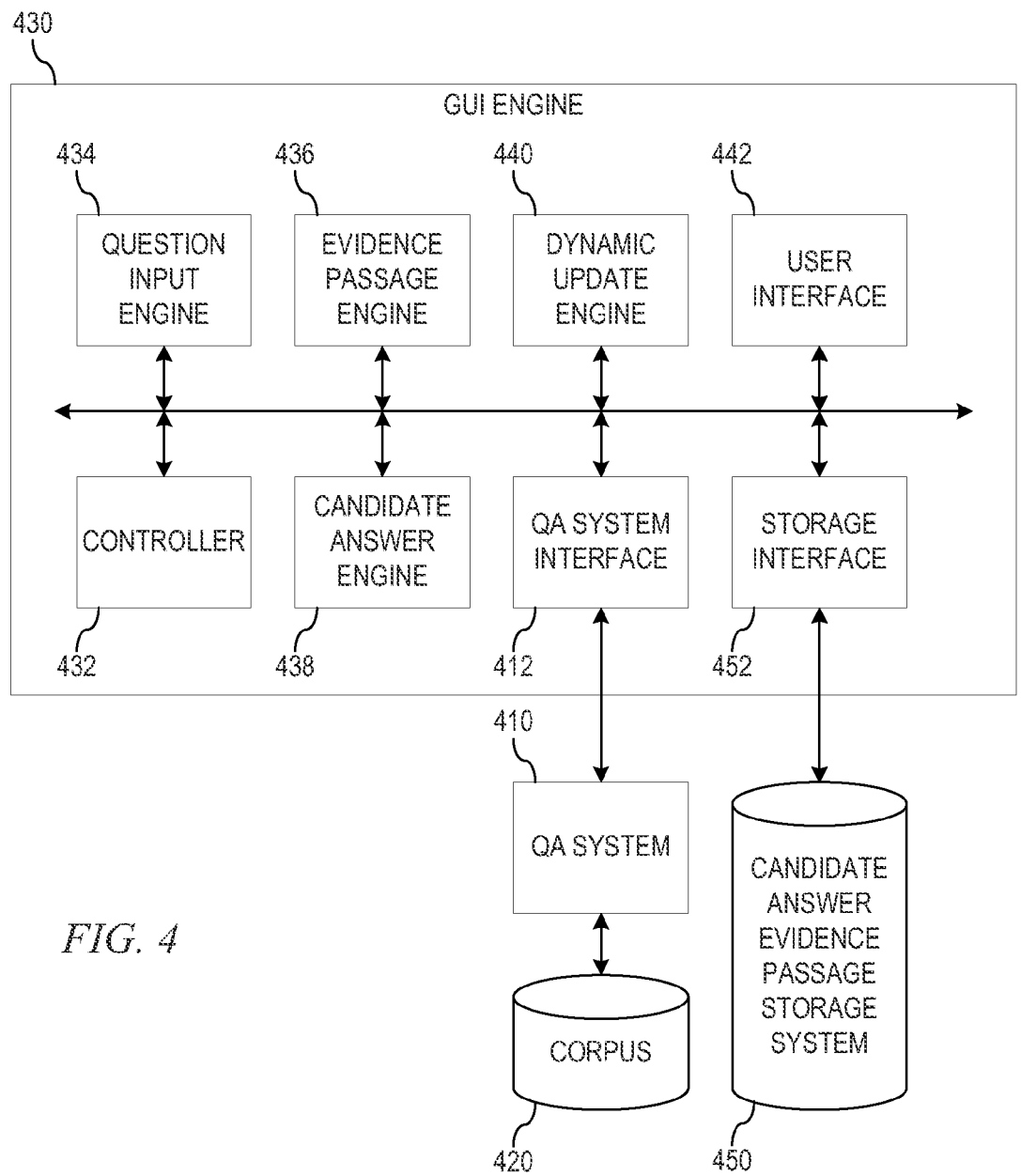
FIG. 4 is an example diagram illustrating an example block diagram of a graphical user interface engine in accordance with one illustrative embodiment.

As shown in FIG. 4, the graphical user interface (GUI) engine 430 of one illustrative embodiment interfaces with a QA system 410 via a QA system interface 412 and a candidate answer evidence passage storage system 450 via storage interface 452. The QA system 410 is any suitable QA system, such as the Watson™ QA system described above, which operates on an input question to generate candidate answers and evaluate those candidate answers for the purposes of providing one or more of the candidate answers as an actual answer for the input question. The input question may be received via the question input engine 434 of the GUI engine 430, for example. In one illustrative embodiment, the GUI engine 430 may execute on a server computing device and may be accessible by client computing devices over one or more data networks such that the GUI generated by the GUI engine 430 is rendered on a client computing device for interaction with a user and whose interactions are transmitted to the server computing device for processing. Alternatively, the GUI engine 430 may execute on the same computing device as the one operated by the user and input may be received directly from the user, via a user interface device, such as a keyboard, mouse, microphone, and/or the like.

The question input engine 434 provides fields for the user to enter an input question and may then format the question for submission to the QA system 410. Based on the input question received via the question input engine 434, the QA system 410 performs the input question parsing and analysis, critical information checking, query generation, query application and candidate answer generation, candidate answer and evidence passage evaluation, identification of missing and/or ambiguous data associated with each of the candidate answers, and scoring, etc. as previously described above. The QA system 410 operates on the corpus of data/information 420 to generate the candidate answers (hypotheses), identify missing and/or ambiguous information that could improve or discount the candidate answers, retrieve evidence passages, and perform the various evaluations previously described. The result of the QA system 410 operations is a set of candidate answers, related missing and/or ambiguous information associated with the candidate answers, evidence passages associated with the candidate answers, and corresponding relevance and confidence scores which may all be stored in the candidate answer evidence passage storage system 450. Moreover, this information may further include links to the source documents in the corpus 420 and other information regarding the veracity and relevancy of the source documents.

The GUI engine 430 further comprises a controller 432, an evidence passage engine 436, a candidate answer engine 438, a dynamic update engine 440, and a user interface 442. The controller 432 controls the overall operation of the GUI engine 430 and comprises logic for coordinating and orchestrating the operation of the other elements of the GUI engine 430 as well as the interfacing of the GUI engine 430 with the QA system 410 and the candidate answer evidence passage storage system 450. The candidate answer engine 438 comprises logic for generating and outputting a portion of a GUI for presenting the candidate answers as well as related missing and/or ambiguous information associated with the candidate answers generated by the QA system 410 or input by a user via the user interface 442, where such input may be a free-form entry of a candidate answer or selection of a sub-portion of an evidence passage, for example, as previously discussed above. The candidate answer portion of the GUI generated by the candidate answer engine 438 may include a ranked listing of the candidate answers organized by increasing/decreasing confidence score as well as one or more missing and/or ambiguous pieces information associated with the candidate answers, if any, with associated GUI elements to provide additional information or eliminate one or more candidate answers from the ranked listing of candidate answers. As mentioned above, in one or more illustrative embodiments, the rankings may be modified based on user input in that user entered or selected candidate answers may be included in the ranked listing of candidate answers despite their particular confidence score but may still be listed in a ranked position based on their confidence score, i.e. even though a user entered candidate answer may not satisfy minimum requirements for inclusion in the ranked listing of candidate answers, it may still be included in the ranked listing but is listed in a position corresponding to its relative confidence score.

The candidate answer engine 438 may further generate GUI elements in association with the candidate answer entries in the GUI that may be selected for providing additional information to the ranked listing of candidate answers or eliminating the candidate answers from the ranked listing of candidate answers. The GUI element, when selected by a user, as indicated in user input received via the user interface 442, causes the corresponding candidate answer to be updated or removed from the ranked listing of candidate answers. Moreover, the corresponding entries for evidence passages in the evidence passage portion of the GUI may be automatically updated to reflect the refinement to the candidate answer or removal of the candidate answer. The ranked listing of candidate answers may also be dynamically updated to re-evaluate the rankings of candidate answers based on the refinement of the candidate answer or the removal of a candidate answer from the ranked listing.

The evidence passage engine 436 comprises logic for generating a portion of the GUI output that lists the evidence passage contributing to the confidence score for each individual candidate answer. That is, the evidence passage portion of the GUI may be organized by candidate answer with the evidence passages contributing to the confidence score of the candidate answer being displayed in association with the candidate answer. The output of the evidence passages in the evidence passage portion of the GUI is done such that sub-portions of the evidence passages, e.g., words, phrases, sentences, and the like, are selectable by a user via the user interface 442 and the user's own user interface input devices, e.g., keyboard, mouse, microphone, etc., so as to create new candidate answers that are automatically added to the ranked listing of candidate answers in response to such selection.

The entries for the evidence passages that are output via the evidence portion of the GUI, as generated by the evidence passage engine 436, may include a representation of the evidence portion and an associated relevance score for the evidence portion as generated by the evaluations performed by the QA system 410. Moreover, the entries may include links to the source documents for the evidence passages for purpose of implementing the drill-down functionality previously described. The drill-down functionality may be facilitated by logic provided in the evidence passage engine 436 which is invoked in response to user input being received via the user interface 442 selecting the link in the entry for the evidence passage.

Moreover, the evidence passage engine 436 generates the evidence passage portion of the GUI with GUI elements for modifying the corresponding relevance scores associated with the evidence passages based on user input. In response to a user providing a user input via the user interface 442 that selects a GUI element for removing an evidence passage, the corresponding evidence passage is eliminated from the GUI output and the change is submitted to the QA system 410 for dynamic re-evaluation of the candidate answers. Similarly, in response to the user providing a user input for providing additional information pertaining to the evidence passage, the change is communicated to the QA system 410 which may dynamically re-evaluate the candidate answers based on the received change.

The dynamic update engine 440 comprises logic for coordinating the user modifications and selections of GUI elements received via the user interface 442. This may involve coordinating the updating of the evidence passage portion and candidate answer portions of the GUI as well as the submission of the modifications to the QA system 410 for re-evaluation of the candidate answers and/or evidence passages associated with the candidate answers. The resulting candidate answers and associated evidence passages generated via the operation of the QA system 410 and the user collaboration provided via the GUI engine 430 may be stored in the candidate answer evidence passage storage system 450 for later retrieval and use.

Figure 5:
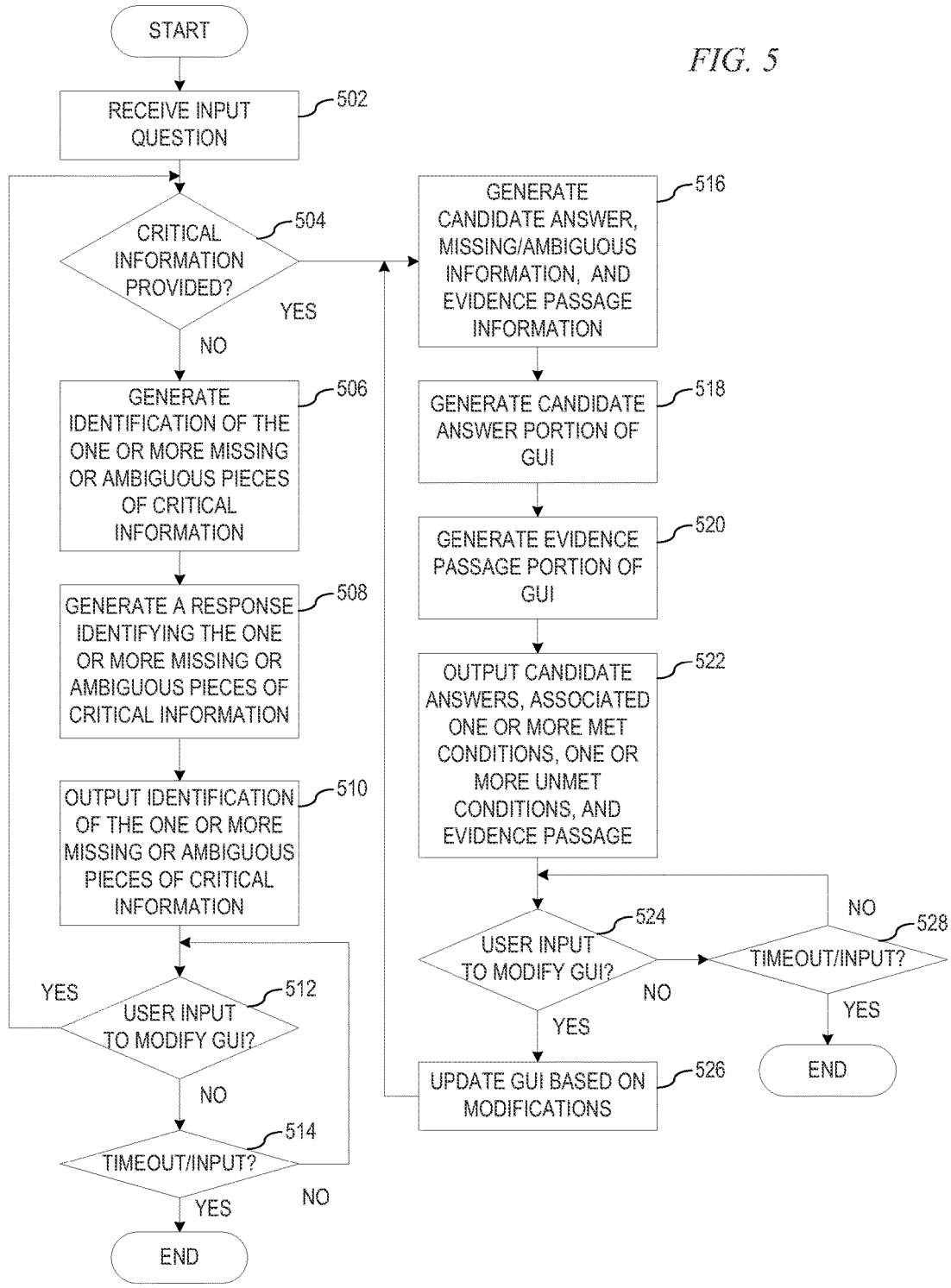
FIG. 5 is a flowchart outlining an example operation for generating a graphical user interface (GUI) for user collaboration with a question and answer system in accordance with one illustrative embodiment.

FIG. 5 is a flowchart outlining an example operation for generating a graphical user interface (GUI) for user collaboration with a question and answer system in accordance with one illustrative embodiment. As shown in FIG. 5, the operation starts by receiving an input question from a user or client device of a user (step 502), such as via question input engine 434 in FIG. 4, for example. The input question is provided to a QA system, such as QA system 410 of FIG. 4, which performs an initial check to determine whether all critical information has been provided with the question or is readably identifiable in relation to the proximity of the question (step 504). If at step 504 there is missing or ambiguous critical information, the QA system generates an identification of the one or more missing or ambiguous pieces of critical information (step 506). A candidate answer portion of a graphical user interface, such as candidate answer engine 438 in FIG. 4, for example, generates a response identifying the one or more missing or ambiguous pieces of critical information (step 508). The GUI comprising the identification of the one or more missing or ambiguous pieces of critical information are output to the user or client device submitting the original input question (step 510).

The GUI and QA system then waits for a user input providing the one or more missing or ambiguous pieces of critical information (step 512). If at step 512 the user input is received identifying the one or more missing or ambiguous pieces of critical information, the operation returns to step 504. If at step 512 the user input is not received, then a determination is made as to whether there is a time out condition or a user input ending the operation of the GUI engine (step 514). If at step 514 there is no time out condition or user input ending the operation of the GUI engine is not received, then the operation returns to step 512. If at step 514 there is a time out condition or user input ending the operation of the GUI engine is received, the operation terminates.

If at step 504 there is no missing or ambiguous critical information, then the QA system generates a listing of candidate answers, missing or ambiguous information that, if provided, would refine the list of candidate answers, corresponding confidence measures, and corresponding evidence passages, relevance scores, and links to source documents for each of the candidate answers (step 516). A candidate answer portion of a graphical user interface, such as candidate answer engine 438 in FIG. 4, for example, generates a ranked listing of candidate answers and one or more missing or ambiguous pieces of information related to each of the candidate answers, if any, based on the confidence scores, GUI elements indicative of each candidate answer's confidence score (step 518).

An evidence passage portion of a graphical user interface, such as evidence passage engine 436 in FIG. 4, for example, is generated organized by candidate answer (step 520). As mentioned above, this evidence passage portion may comprise separate portions for each candidate answer identifying those one or more conditions that have been met, one or more conditions that have not been met, as well as evidence passage entries being provided in association with the candidate answers for which the evidence passage is determined to be relevant and to whose confidence score the evidence passage's relevance score contributes. The GUI comprising the candidate answer portion, the one or more conditions that have been met, the one or more conditions that have not been met, and evidence passage portion are output to the user or client device submitting the original input question (step 522).

The GUI and QA system then waits for a user input modifying a portion of the GUI (step 524) and, in response to receiving a user input modifying a portion of the GUI, the GUI is updated, possibly after forwarding the modifications to the QA system and receiving a re-evaluation of candidate answers and evidence passages associated with the input question, based on additional provided information (step 526), with the operation returning to step 516 thereafter. If at step 524 user input modifying the portion of the GUI is not received, a determination is made as to whether there is a time out condition or a user input ending the operation of the GUI engine (step 528). If at step 528 there is no time out condition or user input ending the operation of the GUI engine, then the operation returns to step 524. If at step 528 there is a time out condition or user input ending the operation of the GUI engine is received, the operation terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory configured to implement a question and answer system (QA), for improving answers to an input question, the method comprising:
   receiving, in the data processing system, the input question;
   processing, by the data processing system, the input question to generate at least one query;
   extracting, by the data processing system, one or more selections of evidence portions from a corpus of information which match the at least one query;
   generating, by the data processing system, one or more candidate answers based on the one or more selections of evidence portions;
   for at least one candidate answer in the one or more candidate answers, determining, by the data processing system, whether there are one or more missing or ambiguous pieces of information that would refine an inclusion or exclusion of the candidate answer in the one or more candidate answers;
   outputting, by the data processing system, the one or more candidate answers, the one or more missing or ambiguous pieces of information that would refine the inclusion or exclusion of the candidate answer in the one or more candidate answers, and the selections of evidence portions for evaluation by the user;
   outputting, by the data processing system, one or more pieces of criteria that identifies conditions met by each candidate answer in the one or more candidate answers in relation to the input question;
   generating, by the data processing system, one or more confidence scores for each of the one or more candidate answers by applying one or more reasoning algorithms to language of the input question and language of the one or more candidate answers;
   comparing, by the data processing system, results of each of the one or more reasoning algorithms to a statistical model;
   based on the comparison of the results to the statistical model, modifying, by the data processing system, the statistical model;
   applying, by the data processing system, statistical weights to confidence scores associated with each of the one or more reasoning algorithms in accordance with the statistical model; and
   synthesizing, by the data processing system, the one or more confidence scores for each of the one or more candidate answers, thereby creating a one or more final answers.

2. The method of claim 1, further comprising:
   storing, by the data processing system, the one or more final answers and corresponding selections of evidence portions in association with the input question;
   receiving, in the data processing system, the input question again after a period of time, wherein the corpus of information has been updated with new information during the period of time;
   processing, by the data processing system, the input question to generate the at least one query;
   extracting, by the data processing system, one or more second selections of evidence portions from the corpus of information which match the at least one query;
   generating, by the data processing system, one or more second candidate answers based on the one or more second selections of evidence portions;
   generating, by the data processing system, one or more second confidence scores for each of the one or more second candidate answers by applying the one or more reasoning algorithms to language of the input question and language of the one or more second candidate answers;
   comparing, by the data processing system, second results of each of the one or more reasoning algorithms to the statistical model;
   based on the comparison of the second results to the statistical model, modifying, by the data processing system, the statistical model;
   applying, by the data processing system, statistical weights to confidence scores associated with each of the one or more reasoning algorithms in accordance with the statistical model;
   synthesizing, by the data processing system, the one or more second confidence scores for each of the one or more second candidate answers, thereby creating one or more second final answers;
   storing, by the data processing system, the one or more second final answers and corresponding second selections of evidence portions in association with the input question; and
   comparing, by the data processing system, the one or more final answers with the one or more second final answers to identify one or more trends describing how the corpus of information has changed during the period of time and how changes to the corpus of information have altered the one or more final answers.

3. The method of claim 1, further comprising:
parsing, by the data processing system, the input question for a known set of critical information helpful in answering the input question;
determining, by the data processing system, whether all specific annotators with regard to the known set of critical information are provided based on a predefined set of critical annotators;
responsive to one or more specific annotators of the predefined set of critical annotators being unidentifiable in the input question, thereby forming a set of missing annotators, determining, by the data processing system, whether the input question is submitted in relation to one or more stored data files associated with a subject of the input question;

responsive to the input question being submitted in relation to one or more stored data files associated with the subject of the input question, parsing, by the data processing system, the one or more stored data files associated with the subject of the input question for the set of missing annotators; and responsive to the set of missing annotators being unidentifiable via parsing the one or more stored data files associated with the subject of the input question, prompting, by the data processing system, a user who submitted the input question for the set of missing annotators.

4. The method of claim 1, further comprising:

receiving, by the data processing system, user input that modifies at least one of the one or more candidate answers or the evidence portions or provides input that provides or clarifies the one or more missing or ambiguous pieces of information;

re-processing, by the data processing system, the input question to generate at least one second query for application to the corpus of information;

applying, by the data processing system, the at least one second query to the corpus of information to generate one or more updated candidate answers to the input question and corresponding updated selections of evidence portions of the corpus of information providing evidence in support of the at least one candidate answer in the one or more candidate answers being the correct answer for the input question;

for each updated candidate answer in the one or more updated candidate answers, determining, by the data processing system, whether there are one or more missing or ambiguous pieces of information that would refine the inclusion or exclusion of the updated candidate answer in the one or more updated candidate answers; and outputting, by the data processing system, the one or more updated candidate answers, the one or more missing or ambiguous pieces of information that would refine the inclusion or exclusion of the updated candidate answer in the one or more updated candidate answers, and the updated selections of evidence portions for evaluation by the user.

5. The method of claim 1, wherein the one or more candidate answers are organized based on the confidence scores associated with the at least one candidate answer and the one or more missing or ambiguous pieces of information associated with the candidate answer, and wherein the organization of the one or more candidate answers is modified based on the user providing input that provides or clarifies the one or more missing or ambiguous pieces of information.

6. A computer program product comprising one or more non-transitory computer-readable storage media and program instructions stored on the one or more non-transitory computer-readable storage media, the program instructions comprising:

program instructions to receive an input question;

program instructions to process the input question to generate at least one query; program instructions to extract one or more selections of evidence portions from a corpus of information which match the at least one query;

program instructions to generate one or more candidate answers based on the one or more selections of evidence portions;

for at least one candidate answer in the one or more candidate answers, program instructions to determine whether there are one or more missing or ambiguous pieces of information that would refine an inclusion or exclusion of the candidate answer in the one or more candidate answers;

program instructions to output, by the data processing system, the one or more candidate answers, the one or more missing or ambiguous pieces of information that would refine the inclusion or exclusion of the candidate answer in the one or more candidate answers, and the selections of evidence portions for evaluation by the user;

program instructions to output, by the data processing system, one or more pieces of criteria that identifies conditions met by each candidate answer in the one or more candidate answers in relation to the input question;

program instructions to generate one or more confidence scores for each of the one or more candidate answers by applying one or more reasoning algorithms to language of the input question and language of the one or more candidate answers;

program instructions to compare results of each of the one or more reasoning algorithms to a statistical model;

based on the comparison of the results to the statistical model, program instructions to modify the statistical model;

program instructions to apply statistical weights to confidence scores associated with each of the one or more reasoning algorithms in accordance with the statistical model; and program instructions to synthesize the one or more confidence scores for each of the one or more candidate answers, thereby creating a one or more final answers.

7. The computer program product of claim 6, further comprising:

program instructions to store the one or more final answers and corresponding selections of evidence portions in association with the input question;

program instructions to receive the input question again after a period of time, wherein the corpus of information has been updated with new information during the period of time;

program instructions to process the input question to generate the at least one query;

program instructions to extract one or more second selections of evidence portions from the corpus of information which match the at least one query;

program instructions to generate one or more second candidate answers based on the one or more second selections of evidence portions;

program instructions to generate one or more second confidence scores for each of the one or more second candidate answers by applying the one or more reasoning algorithms to language of the input question and language of the one or more second candidate answers;

program instructions to compare second results of each of the one or more reasoning algorithms to the statistical model;

based on the comparison of the second results to the statistical model, program instructions to modify the statistical model;

program instructions to apply statistical weights to confidence scores associated with each of the one or more reasoning algorithms in accordance with the statistical model;

program instructions to synthesize the one or more second confidence scores for each of the one or more second candidate answers, thereby creating one or more second final answers;

program instructions to store the one or more second final answers and corresponding second selections of evidence portions in association with the input question; and program instructions to compare the one or more final answers with the one or more second final answers to identify one or more trends describing how the corpus of information has changed during the period of time and how changes to the corpus of information have altered the one or more final answers.

8. The computer program product of claim 6, further comprising:

program instructions to parse the input question for a known set of critical information helpful in answering the input question;

program instructions to determine whether all specific annotators with regard to the known set of critical information are provided based on a predefined set of critical annotators;

responsive to one or more specific annotators of the predefined set of critical annotators being unidentifiable in the input question, thereby forming a set of missing annotators, program instructions to determine whether the input question is submitted in relation to one or more stored data files associated with a subject of the input question;

responsive to the input question being submitted in relation to one or more stored data files associated with the subject of the input question, program instructions to parse the one or more stored data files associated with the subject of the input question for the set of missing annotators; and responsive to the set of missing annotators being unidentifiable via parsing the one or more stored data files associated with the subject of the input question, program instructions to prompt, by the data processing system, a user who submitted the input question for the set of missing annotators.

9. The computer program product of claim 6, further comprising:

program instructions to receive, by the data processing system, user input that modifies at least one of the one or more candidate answers or the evidence portions or provides input that provides or clarifies the one or more missing or ambiguous pieces of information;

program instructions to re-process the input question to generate at least one second query for application to the corpus of information;

program instructions to apply the at least one second query to the corpus of information to generate an updated one or more candidate answers to the input question and corresponding updated selections of evidence portions of the corpus of information providing evidence in support of the at least one candidate answer in the one or more candidate answers being the correct answer for the input question;

for each updated candidate answer in the one or more updated candidate answers, program instructions to determine whether there are one or more missing or ambiguous pieces of information that would refine the inclusion or exclusion of the updated candidate answer in the one or more updated candidate answers; and program instructions to output, by the data processing system, the one or more updated candidate answers, the one or more missing or ambiguous pieces of information that would refine the inclusion or exclusion of the updated candidate answer in the one or more updated candidate answers, and the updated selections of evidence portions for evaluation by the user.

10. The computer program product of claim 6, wherein the one or more candidate answers are organized based on the confidence scores associated with the at least one candidate answer and the one or more missing or ambiguous pieces of information associated with the candidate answer, and wherein the organization of the one or more candidate answers is modified based on the user providing input that provides or clarifies the one or more missing or ambiguous pieces of information.

11. An apparatus comprising: one or more computer processors, one or more non-transitory computer-readable storage media, and program instructions stored on one or more of the non-transitory computer-readable storage media for execution by at least one of the one or more processors, the program instructions comprising:

program instructions to receive an input question;

program instructions to process the input question to generate at least one query; program instructions to extract one or more selections of evidence portions from a corpus of information which match the at least one query;

program instructions to generate one or more candidate answers based on the one or more selections of evidence portions;

for at least one candidate answer in the one or more candidate answers, program instructions to determine whether there are one or more missing or ambiguous pieces of information that would refine an inclusion or exclusion of the candidate answer in the one or more candidate answers;

program instructions to output, by the data processing system, the one or more candidate answers, the one or more missing or ambiguous pieces of information that would refine the inclusion or exclusion of the candidate answer in the one or more candidate answers, and the selections of evidence portions for evaluation by the user;

program instructions to output, by the data processing system, one or more pieces of criteria that identifies conditions met by each candidate answer in the one or more candidate answers in relation to the input question;

program instructions to generate one or more confidence scores for each of the one or more candidate answers by applying one or more reasoning algorithms to language of the input question and language of the one or more candidate answers;

v program instructions to compare results of each of the one or more reasoning algorithms to a statistical model;

based on the comparison of the results to the statistical model, program instructions to modify the statistical model;

program instructions to apply statistical weights to confidence scores associated with each of the one or more reasoning algorithms in accordance with the statistical model; and program instructions to synthesize the one or more confidence scores for each of the one or more candidate answers, thereby creating a one or more final answers.

12. The apparatus of claim 11, further comprising:
program instructions to store the one or more final answers and corresponding selections of evidence portions in association with the input question;
program instructions to receive the input question again after a period of time, wherein the corpus of information has been updated with new information during the period of time;
program instructions to process the input question to generate the at least one query;
program instructions to extract one or more second selections of evidence portions from the corpus of information which match the at least one query;
program instructions to generate one or more second candidate answers based on the one or more second selections of evidence portions;
program instructions to generate one or more second confidence scores for each of the one or more second candidate answers by applying the one or more reasoning algorithms to language of the input question and language of the one or more second candidate answers;
program instructions to compare second results of each of the one or more reasoning algorithms to the statistical model;
based on the comparison of the second results to the statistical model, program instructions to modify the statistical model;
program instructions to apply statistical weights to confidence scores associated with each of the one or more reasoning algorithms in accordance with the statistical model;
program instructions to synthesize the one or more second confidence scores for each of the one or more second candidate answers, thereby creating one or more second final answers;
program instructions to store the one or more second final answers and corresponding second selections of evidence portions in association with the input question; and
program instructions to compare the one or more final answers with the one or more second final answers to identify one or more trends describing how the corpus of information has changed during the period of time and how changes to the corpus of information have altered the one or more final answers.

13. The apparatus of claim 11, further comprising:
program instructions to parse the input question for a known set of critical information helpful in answering the input question;
program instructions to determine whether all specific annotators with regard to the known set of critical information are provided based on a predefined set of critical annotators;
responsive to one or more specific annotators of the predefined set of critical annotators being unidentifiable in the input question, thereby forming a set of missing annotators, program instructions to determine whether the input question is submitted in relation to one or more stored data files associated with a subject of the input question;
responsive to the input question being submitted in relation to one or more stored data files associated with the subject of the input question, program instructions to parse the one or more stored data files associated with the subject of the input question for the set of missing annotators; and
responsive to the set of missing annotators being unidentifiable in via parsing the one or more stored data files associated with the subject of the input question, program instructions to prompt, by the data processing system, a user who submitted the input question for the set of missing annotators.

14. The apparatus of claim 11, further comprising:
program instructions to receive, by the data processing system, user input that modifies at least one of the one or more candidate answers or the evidence portions or provides input that provides or clarifies the one or more missing or ambiguous pieces of information;
program instructions to re-process the input question to generate at least one second query for application to the corpus of information;
program instructions to apply the at least one second query to the corpus of information to generate one or more updated candidate answers to the input question and corresponding updated selections of evidence portions of the corpus of information providing evidence in support of the at least one candidate answer in the one or more candidate answers being the correct answer for the input question;
for each updated candidate answer in the one or more updated candidate answers, program instructions to determine whether there are one or more missing or ambiguous pieces of information that would refine the inclusion or exclusion of the updated candidate answer in the one or more updated candidate answers; and
program instructions to output, by the data processing system, the one or more updated candidate answers, the one or more missing or ambiguous pieces of information that would refine the inclusion or exclusion of the updated candidate answer in the one or more updated candidate answers, and the updated selections of evidence portions for evaluation by the user.

15. The apparatus of claim 11, wherein the one or more candidate answers are organized based on the confidence scores associated with the at least one candidate answer and the one or more missing or ambiguous pieces of information associated with the candidate answer, and wherein the organization of the one or more candidate answers is modified based on the user providing input that provides or clarifies the one or more missing or ambiguous pieces of information.

* * * * *